(12) United States Patent
Kara et al.

(10) Patent No.: US 6,199,055 B1
(45) Date of Patent: Mar. 6, 2001

(54) SYSTEM AND METHOD FOR PROVIDING FAULT TOLERANT TRANSCRIPTIONS OVER AN UNSECURED COMMUNICATION CHANNEL

(75) Inventors: Salim G. Kara; Manish Desai, both of Houston; Mohammas A. Husain, Humble, all of TX (US); Martin J. Pagel, Kirkland, WA (US); Ken D. Hinh, League City, TX (US)

(73) Assignee: E-Stamp Corporation, San Mateo, CA (US)

( * ) Notice: Subject to any disclaimer, the term of this patent is extended or adjusted under 35 U.S.C. 154(b) by 0 days.

(21) Appl. No.: 08/965,069

(22) Filed: Nov. 5, 1997

(51) Int. Cl.[7] .................................................. G06F 17/60
(52) U.S. Cl. .............................. 705/405; 705/39; 714/2; 714/15; 714/19; 714/747
(58) Field of Search ............................... 371/31; 395/181, 395/182.13, 182.17; 705/35, 39, 41, 400, 405; 714/2, 15, 19, 747; 902/38, 41

(56) References Cited

U.S. PATENT DOCUMENTS

| | | | |
|---|---|---|---|
| 4,740,969 | * | 4/1988 | Fremont .................................. 714/15 |
| 4,805,109 | * | 2/1989 | Kroll et al. ........................... 705/405 |
| 4,817,004 | * | 3/1989 | Kroll et al. ........................... 705/405 |
| 4,845,632 | * | 7/1989 | Kroll et al. ........................... 705/405 |
| 5,021,963 | * | 6/1991 | Brown et al. ......................... 705/405 |
| 5,065,311 | * | 11/1991 | Masai et al. ............................ 714/20 |
| 5,095,421 | * | 3/1992 | Freund .................................. 709/101 |
| 5,335,343 | * | 8/1994 | Lampson et al. ....................... 714/19 |
| 5,440,634 | * | 8/1995 | Jones et al. ............................. 308/24 |
| 5,508,933 | * | 4/1996 | Abumehdi ............................ 705/408 |
| 5,561,795 | * | 10/1996 | Sarkar ..................................... 77/202 |
| 5,638,443 | * | 6/1997 | Stefik et al. .............................. 380/4 |
| 5,706,500 | * | 1/1998 | Dzikewich et al. ................... 707/10 |
| 5,715,164 | * | 2/1998 | Liechti et al. ....................... 704/410 |
| 5,796,834 | * | 8/1998 | Whitney et al. ....................... 380/25 |
| 5,801,364 | * | 9/1998 | Kara et al. ........................... 235/375 |
| 5,875,291 | * | 2/1999 | Fox ......................................... 714/15 |
| 5,878,215 | * | 3/1999 | Kling et al. .......................... 709/209 |
| 5,905,857 | * | 5/1999 | Buzby et al. ........................... 714/38 |

* cited by examiner

*Primary Examiner*—Edward R. Cosimano
(74) *Attorney, Agent, or Firm*—Fulbright & Jaworski L.L.P.

(57) ABSTRACT

A system and method for conducting secure fault tolerant transactions, such as financial transaction, remotely is disclosed. The transactions are conducted utilizing a portable processor device which is initialized and authorized according to the present invention. Thereafter, the portable processor operates to conduct transactions involving information exchange through unsecured communication paths according to a predetermined protocol. The protocol includes the use of atomic transactions within the portable processor device.

44 Claims, 4 Drawing Sheets

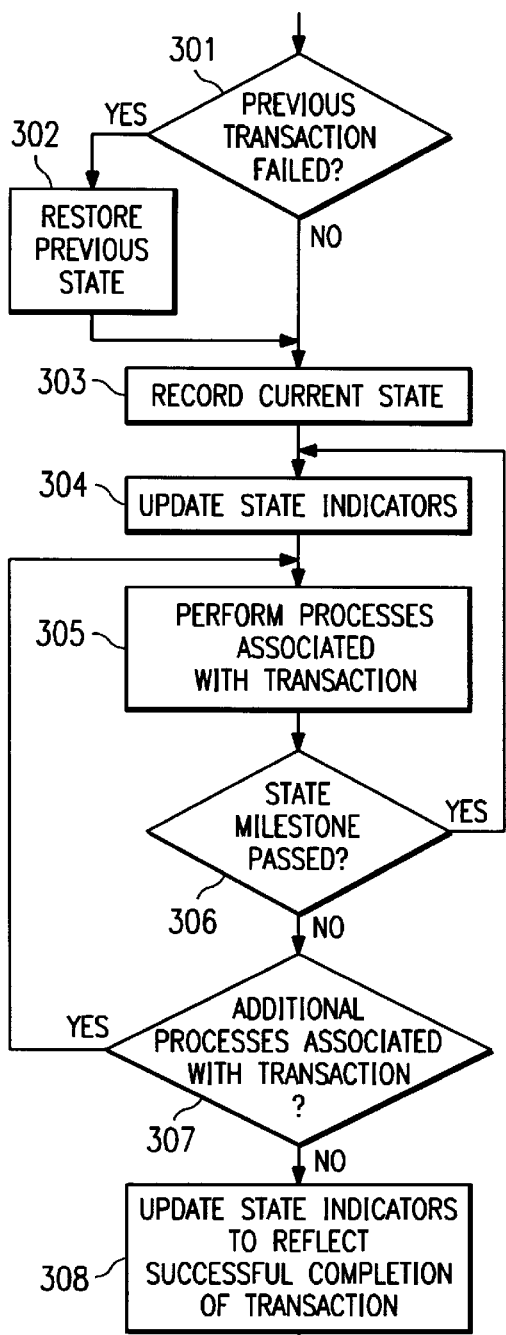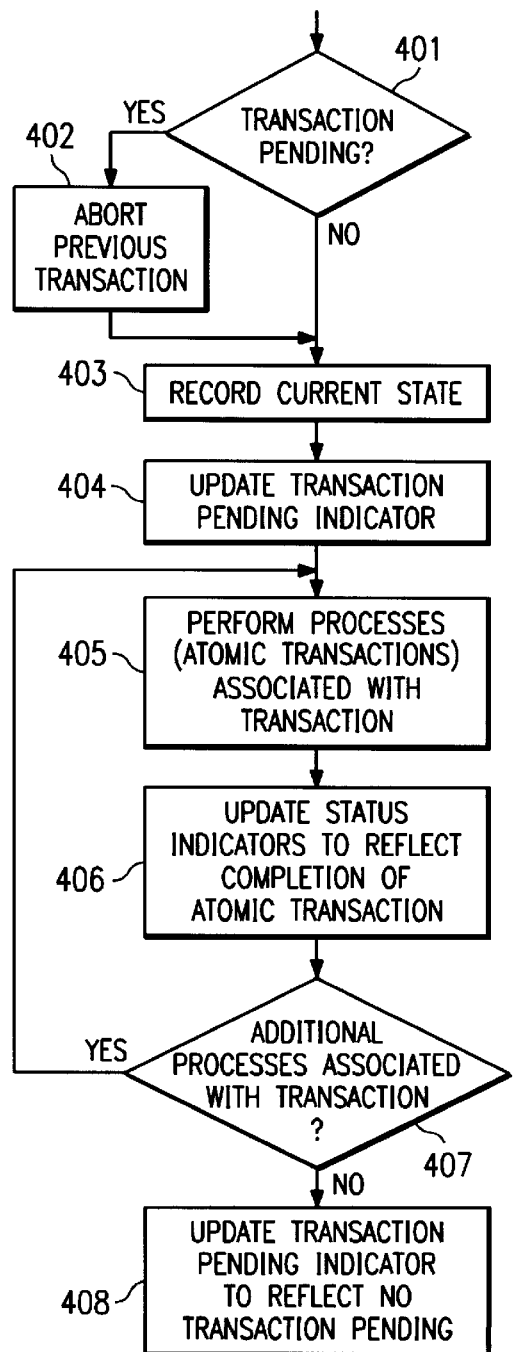
FIG. 3
FIG. 4

SYSTEM AND METHOD FOR PROVIDING FAULT TOLERANT TRANSCRIPTIONS OVER AN UNSECURED COMMUNICATION CHANNEL

RELATED APPLICATIONS

Reference is hereby made to the following co-pending and commonly assigned U.S. Patent applications: SYSTEM AND METHOD FOR CONTROLLING THE DISPENSING OF AN AUTHENTICATED INDICIA, Ser. No. 08/812,803 filed Mar. 6, 1997, now U.S. Pat. No. 5,796,834; SYSTEM AND METHOD FOR CONTROLLING THE STORAGE OF DATA WITHIN A PORTABLE MEMORY, Ser. No. 08/515,988 filed Aug. 16, 1995, now U.S. Pat. No. 5,801,364; and SYSTEM AND METHOD FOR PRINTING MULTIPLE POSTAGE INDICIA, Ser. No. 08/965,015 filed concurrently with the present application; the disclosures of which applications are incorporated herein by reference.

TECHNICAL FIELD OF THE INVENTION

This invention relates in general to a system and method for providing secure fault tolerant transactions over an unsecured data path. More particularly, the invention relates to a portable processor device that can be coupled to processor-based host systems to conduct financial transactions, such as to receive and retrieve an amount of pecuniary credit.

BACKGROUND OF THE INVENTION

It is often desirable today to conduct trusted transactions, such as financial transactions, with an individual where only limited or no supervision is required of a trusted party, such as an employee of the financial institution. Such automated transactions are common today as automated teller machine (ATM) transactions. There, an individual may conduct a transaction, such as withdrawal of an amount of cash from a bank account, at a location remote from the financial institution and without any supervision or interaction with anyone from the financial institution.

It shall be appreciated that, although no person provides supervision (arbitration) over the transaction, the device with which the individual conducts the transaction provides trusted interaction through the use of secure vaults, passwords, etcetera. For example, the ATM requires an individual to identify an account through information provided on an ATM card and to identify himself through input of a personal identification number (PIN).

Typically, to provide security for the transaction, i.e., to avoid fraud or rogue interception/use of transaction information, the transactions are conducted using secure links. For example, because the account information and the associated PIN are stored on the ATM card, the ATM provides a secure link between the ATM card and the ATM, such as by accepting the card for reading of the information within the secure confines of the ATM itself. However, often it is desirable to conduct such transactions remotely, such as for example the electronic transmission pecuniary value for use in a value dispensing device such as a postage meter.

Although information security techniques, such as encryption of transmitted electronic data, may be utilized to maintain a certain amount of security in a transaction conducted remotely, there are additional problems to be overcome, especially in the case of financial transactions. In the case of the ATM transaction above, it should be realized that when the individual withdraws an amount of cash from an account there are at least two transactions that take place. Initially, the ATM must deduct from the individual's account records an amount equal to the cash amount ultimately to be dispensed to the individual. Additionally, the ATM must dispense an amount of cash, or cash value, equal to the amount deducted from the individual's account records to the individual. If the withdrawal transaction were to be interrupted between these two steps, i.e., the individual's account is debited but the individual does not receive the amount of cash, the failed transaction will result in error in at least one party's status.

A technique used to ensure such transactions do not result in an undesired state if interrupted is the "two-phase commit." Here a centralized arbiter, such as a central processor or server, will ensure that a transaction that involves more than a single step does either all or none of the steps. If the transaction fails to complete the final phase of processing all the updates made so far are reversed automatically. Accordingly, if the transaction were to be interrupted before the individual received his cash, the ATM would reverse the debit to the individual's account.

It should be appreciated that the two-phase commit requires central control or arbitration in order to reliably determine/command a complete transaction or a complete reversal. This requirement is not a problem in the ATM example, as the ATM provides a secure environment in which to conduct the transaction. However, conducting remote transactions, as is often desired, does present a problem for a two-phase commit type solution.

In the case of the aforementioned postage meter, remote credit transfer likely includes the use of unsecured communication links, such as a public switched network (PSN) to interact with a user or service not under control of a trusted party. Moreover, a single arbiter is unable to reliably determine/command a compete transaction or complete reversal as communication with the remote site may be lost, either accidentally or purposefully.

A need therefore exists in the art for a system and method for reliably providing secure fault tolerant transactions, such as financial transactions, through the use of remotely located devices.

There is a further need in the art for a secure portable processor device to provide trusted interaction with a remote device in conducting a transaction.

There is still a further need in the art for a system and method for providing complete financial transactions between coupled devices or for resetting such devices in the event of a failure to complete the financial transaction. Likewise, there is a need in the art to provide for such financial transactions over an unsecured data path while maintaining security and fault tolerance.

A yet further need exists in the art for a system and method for recording, as transactions take place, information about each transaction and maintaining a log of the most recent transactions, in order to provide resetting of the devices and/or management functions such as detection of fraud.

SUMMARY OF THE INVENTION

These and other objects, features and technical advantages are achieved by a system and method wherein a secure portable device is constructed with a memory and having a processor controlling that memory. The device is arranged to communicate with a host processor based system, such as a PC, in order to exchange instructions therewith.

The portable processor device has on board certain security related fields, such as cryptographic keys, the current date and time, the balance, random number generators, number of transactions that have taken place on the device, and the serial number of the device. It also has on board, when the user initializes/authorizes the device, information about the owner of the device including his/her name, the registration number and other information about the owner such as the user's address and password.

Typically, the portable processor device will consist of a general purpose processor device which, as produced, includes certain necessary components for utilization as a secure portable processor according to the present invention. Upon initialization, a "raw" general purpose processor device will be adapted to operate according to the present invention. For example, program structure including a limited number of commands will be downloaded to firmware in the portable processor. Likewise, memory areas and cryptographic keys will be initialized in the device. Upon completion of initialization, the ability to change this initialization information will be "locked down," or irreversibly established, in order to unalterably define the general purpose processor device as a portable processor of the present invention.

In order to utilize a particular portable processor device, a user will be required to receive authorization. The authorization process is to set up the secure device for use by a particular user and/or for particular purposes according to the present invention. Authorization may include the storage of certain information within the portable processor itself, such as the aforementioned information about the owner of the device including his/her name, the registration number and other information about the owner such as the user's address and password. Additionally, authorization may include recording certain information, such as identification of the portable processor device or the identification of a particular user associated with a portable processor device, at a centralized database for use in validating subsequent transactions.

In another embodiment of the present invention, the aforementioned portable processor devices are specially manufactured for use in conjunction with the present invention, i.e., unique serial numbers specific to the program are embedded within each portable processor button. These serial numbers may then be recorded in a user registration database for use by a remote system, such as might be operated by a Postal Authority in providing postage credit through the use of the portable processor devices. Thus, additional security is provided since only the portable processor devices specially manufactured for use with the present invention are able to receive or retrieve data pertaining to postage amounts.

Once successfully, initialized and authorized, a portable processor device may then be utilized in conducting robust, fault tolerant, trusted transactions with a host processor based system and/or a remote system, such as a remote value dispensation device. According to the present invention, the remote system is itself a secure system, operated by a trusted party to the transaction. However, it shall be appreciated that the host processor based system and/or the communication path utilized according to the present invention may both be unsecured and even somewhat unstable. It is an object of the present invention to operate to provide for secure fault tolerant transactions through such limitations.

When a transaction is conducted over an unsecured communication path, such as via the Internet, PSN or computer network, or local or wide area networks, the portable processor device operates according to a predetermined protocol to conduct the transaction. Where the transaction involves a remote system, preferably the remote system will also operate according to a predetermined protocol. The predetermined protocol preferably includes the use of "atomic transactions" within the portable processor device. These atomic transactions, although possibly involving any number of component transaction steps, or processes, internal to the portable processor device, appear externally to be a single transaction. I.e., each atomic transaction performed by the portable processor is either completed in its entirety, or any component transaction steps performed within the portable processor resulting in a failure to fully complete the transaction are rolled back to place the portable processor in a state as if the atomic transaction was not attempted.

The portable processor device operates, such as through the use of the aforementioned atomic transactions, to interact with the remote system in order to securely perform the desired transaction (referred to hereinbelow as an "external transaction"). Here, both the portable processor and the remote system store the state of the portable processor prior to performing the steps necessary to perform a particular transaction. Accordingly, if a communication error interrupts communication associated with a particular step, appropriate action may be taken at either or both the portable processor device or remote system to complete the transaction. Likewise, the storage of such state information facilitates the ability at either or both the portable processor device or remote system for providing roll back of the portable processor device in the case of an irrecoverable error in the completion of the desired transaction.

To provide security for the transmission of data in performing transactions/transaction steps according to the present invention, various security features of the portable processor may be utilized. Initially, it is noted that the portable processor device provides a physically secure environment for the processor, memory, firmware, etcetera in operation of the present invention. Moreover, information fields, such as the aforementioned cryptographic keys, user identification, current date and time, number of transactions that have taken place on the device, serial number of the device, etcetera are utilized alone or in combination to provide for the use of communicated data only by the proper portable processor or remote system. For example, cryptographic keys may be utilized device and remote system to digitally sign or confirm the signature of data communicated therebetween. Similarly, device serial number and transaction number information may be utilized by the portable processor to ensure that particular data is usable only with a particular portable processor for a particular transaction.

Additionally, when a desired transaction is accomplished using the portable processor device, recorded transaction information can be analyzed either from the perspective of management information or to try to detect fraud. This allows for authentication or verification at a point remote (both physically and electronically) from the user and remote from the host and even remote from the portable processor device.

It is one technical advantage of this invention that the most vital security related pieces of the system are performed on board the portable processor device so that it is tamper proof.

It is another technical advantage of this invention that the portable processor device provides atomic transactions to provide for secure interaction utilizing an unsecured host and/or communication path.

It is another technical advantage of this invention that the portable processor devices and the remote system in communication therewith store transaction state information in order to provide for transaction fault tolerance and transaction roll back in the case where the desired transaction is not completed.

It is another feature of this invention to provide a system and method that, as transactions take place, the portable memory records information about each transaction and maintains a log of the most recent transactions.

In one embodiment, it is a technical advantage of the invention that it presents a system and method for securely transmitting and storing postage credit, or other pecuniary value information, electronically to a portable processor through the use of a remote secure credit server and an unsecured communication path, enabling the user to obtain an official transaction at a point detached from the trusted environment of the credit provider.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 3 illustrates a flow diagram for performing an atomic transaction according to the present invention;

FIG. 4 illustrates a flow diagram for performing an external transaction by a portable processor device of the present invention.

DESCRIPTION OF THE PREFERRED EMBODIMENTS

The present invention provides for a portable processor device, described in more detail below, which can be coupled to a host processor-based system at a user's site in order to provide a system and method by which the user may conduct desired transactions. The desired transactions may be local, such as the dispensation of postage credit in the form of an authorized postage indicia, or may be remote, such as the request and receipt of postage credit from a remote credit server operated by a Postal Authority. Throughout the remainder of this description, reference is made to the U.S. Post Office, postal authority or its agents. Note, however, that the present invention may be implemented within any country and with respect to any postal system. Moreover, it shall be appreciated that the present invention is not limited to use in postage transactions and, in fact, provides advantages in conducting transactions for any number of purposes or services.

In a preferred embodiment, the present invention will allow an individual to purchase a desired amount of postage credit from an authorized agent of the U.S. Post Office over an unsecured communication path, such as the Internet. Moreover, the present invention interfaces with the user through the use of an unsecured, general purpose, computer system, such as a desk top PC, while maintaining security for both the information stored within the portable processor device as well as that information transmitted between the portable processor device and the remote system. Accordingly, the user may invoke a host processor-based system to access, retrieve, and refill the stored amount of postage via a program stored on the host processor-based system, such program hereinafter referred to as the "E-STAMP™" program.

The portable postage dispensing device can also be coupled to a host processor-based system located at other sites, such as that of an authorized U.S. Post Office Agent. Accordingly, particular post office sites and authorized agents will preferably have installed a system complimentary to the software system installed on the customer's PC. The program installed at such sites, hereinafter referred to as "POSTAGEMAKER™," will allow an authorized agent to interface the portable processor device with the host processor-based system residing at the authorized refilling agent in order to perform initialization, maintenance, and/or validation functions.

Figure 1A:
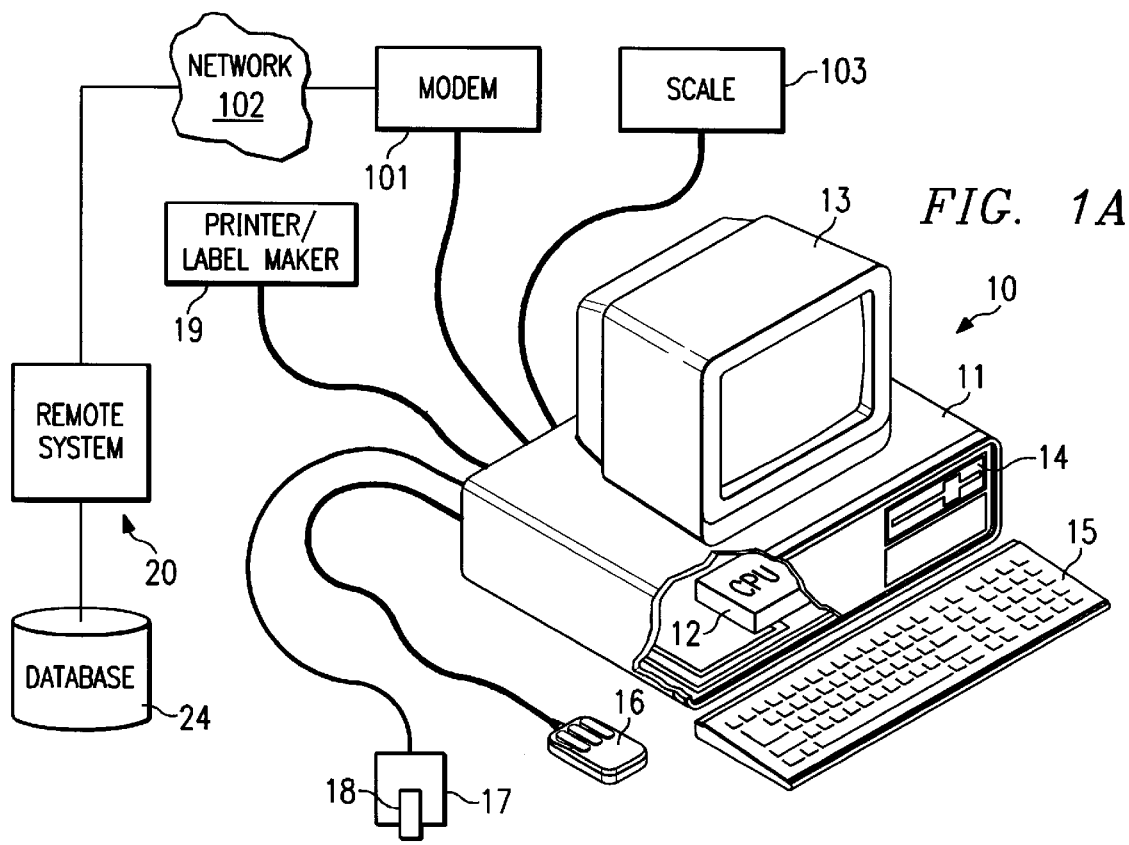
FIG. 1A illustrates a system for implementation of the present invention.

Referring to FIG. 1A, there is illustrated a processor-based system (10) utilized in implementing the present invention, specifically the aforementioned E-STAMP and POSTAGEMAKER programs. System 10 includes chassis 11 enclosing central processing unit ("CPU") 12 and disk drive 14. Coupled to CPU 12 is display 13, keyboard 15 and mouse 16. Furthermore, system 10 is adapted for coupling with a portable processor device 18. Portable processor device 18 is coupled to processor-based system 10 through portable processor device receptor, or interface, 17.

As discussed in detail below, the portable processor device may be any secure, intelligent device having some residual data capability, where that device can provide sufficient security measures to efficiently limit access to the memory and executable code of the device to authorized users. Intelligence is defined as having a CPU or other processor and memory built into the portable processor device.

In a preferred embodiment of the present invention, a batch of portable processor devices will be manufactured with specifically designated serial numbers for use solely with the present invention. However, disposable portable processor devices 18, possibly preloaded in various denominations, could also be sold, such as over the counter or in existing stamp machines at post office locations. The postal authority may also elect to sell pre-loaded portable processors, on which the customer pays a deposit, that can be exchanged for another portable processor or returned for the deposit whenever portable processor device 18 is depleted of credit or a preestablished time or date has transpired, for example.

Figure 1B:
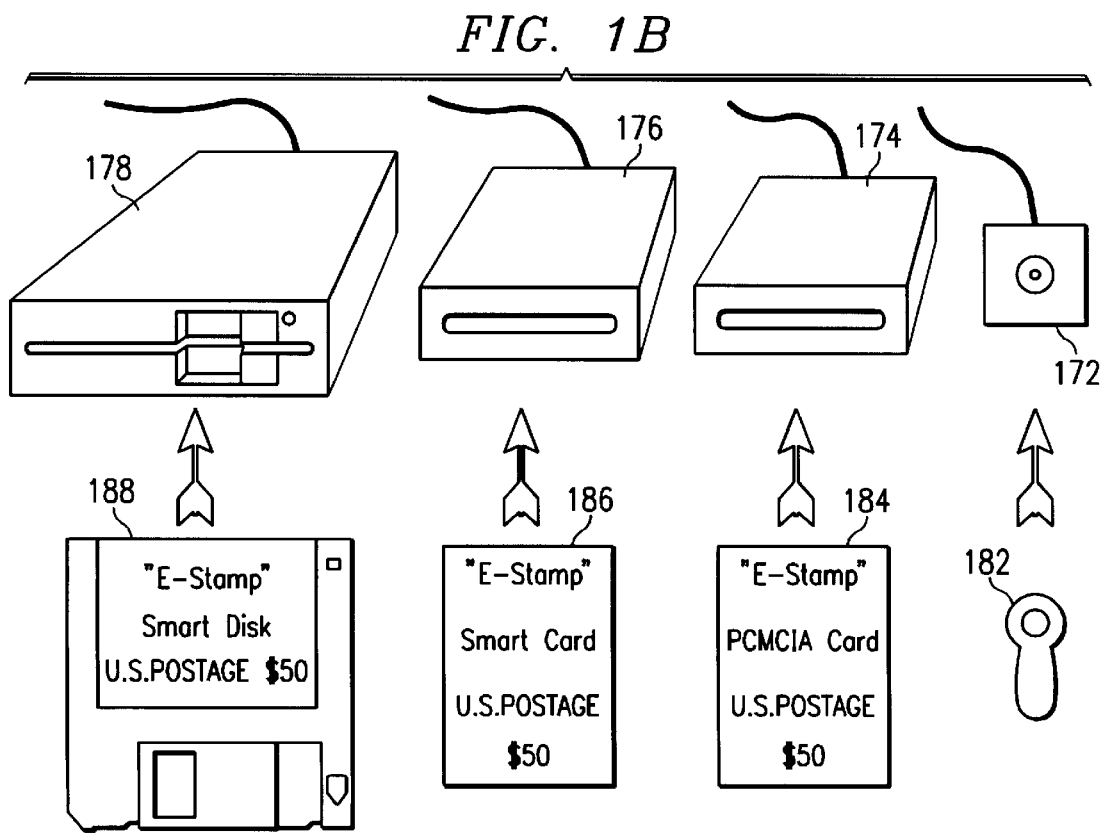
FIG. 1B illustrates several embodiments of the portable processor device of the present invention.

Alternative embodiments of the portable postage dispensing device 18 are illustrated in FIG. 1B. One alternative portable processor device 18 is a smart disk 188 incorporating its own electronic modules capable of read/write operations. One embodiment of such a smart disk 188, SMART DISK™, can be obtained from Smart Disk Security Corporation, Naples, Fla. The smart disk looks like a floppy disk and fits into a typical PC's floppy disk drive, such as disk drive 178, connected either externally or internally to host processor-based system 10. However, the smart disk has its own microprocessor that provides secure, password protected storage. One advantage of the smart disk is that it can operate in a standard PC disk drive without modification to the disk drive or PC. Smart disk provides security for stored postage with an encrypted password and the encryption algorithm.

Another type of portable postage dispensing device 18 is a smart card 186, a plastic or composite card with embedded micro-circuitry. The micro-circuitry contains mathematical formulas that encrypt computer data to secure access to that data (i.e., postage credit) and verify a user's identity before allowing access to the data. One drawback in the currently available smart cards 186 is that they require a non-standard smart card interface 176 hooked to processor-based system 10.

Still another type of portable processor device 18 is a PCMCIA card 184. PCMCIA cards are currently used on notebook computers for modular storage and communication. Both external and internal add-on interfaces 174 (i.e., card slots) are commonly available for PCs. Moreover, many PCs are initially equipped to interface with such cards without requiring the addition of any hardware interface.

The preferred embodiment of the portable processor device, portable processor button 182, incorporates a small disk having a memory and CPU. Portable processor button 182 is a small, light-weight, portable, essentially non-breakable device, such as is available from Dallas Semiconductor, Dallas, Tex., as a TOUCH MEMORY™. Portable processor button 182 is coupled to the host through a button interface such as button interface 172.

An advantage of the preferred embodiment (utilizing portable processor button 182) is that a portable processor button 182 is small enough and light enough that several may be carried in one hand. Furthermore, the portable processor button 182 is sufficiently durable to be sent through the mail. The fact that the portable processor is universally usable with PC's allows the per unit cost to be lower.

Regardless of the particular embodiment, portable processor device 18 may be used on a variety of host processor-based systems 10. Host processor-based systems 10 may be located in an individual's home, at any business location, or may even be present in a post office, or other issuing authority, lobby for public use, such as for provision of after hours services.

In a preferred embodiment, system 10 and remote system 20 are general purpose PCs, such as computer systems based on the INTEL 80X86 or MOTOROLA 680X0 processors. In an alternative embodiment, either system 10 or remote system 20 could be part of a main-frame computer or part of a network system of multiple host processor-based systems.

Where, for example, no user interaction is required in conducting the transaction between the portable processor device and the remote system, system 10 could simply be an apparatus providing data communication between the portable processor and the remote system. For example, system 10 could simply include portable processor device receptor 17 and modem 101.

System 10 and remote system 20 may be adapted to provide functionality in addition to or in association with the conducting of transactions with the portable processor device. Modem 101 is coupled to system 10 to provide communication with remote system 20 through network 102. Network 102 may be any form of information communication path, such as the Internet, a wide area network (WAN), a local area network (LAN), a fibre optic system, a satellite system, a public switched network (PSN), or even a cable system. Of course, where the embodiment of network 102 does not necessitate the use of a modem at system 10, modem 101 may be eliminated if desired. However, it shall be appreciated that such alternative embodiments of network 102 may require the use of communications adapters such as a network interface card (NIC) or other devices (not shown) in place of, or in combination with, modem 101.

Additionally, system 10 may include additional devices such as scale 103 or printer/label maker 19. These devices may be utilized in conjunction with the transactions of the present invention, such as to determine a proper amount of postage for a particular mail item or to print a postage indicia which utilizes an amount of the postage credit discussed herein.

THE SECURE PORTABLE PROCESSOR DEVICE

Preferably, portable processor device 18, such as the preferred embodiment portable processor button 182 illustrated in FIG. 1B, includes certain minimum functionality. This functionality is preferably provided by particular hardware, firmware, and/or RAM components contained within the physically secure confines of the portable processor device.

Figure 2:
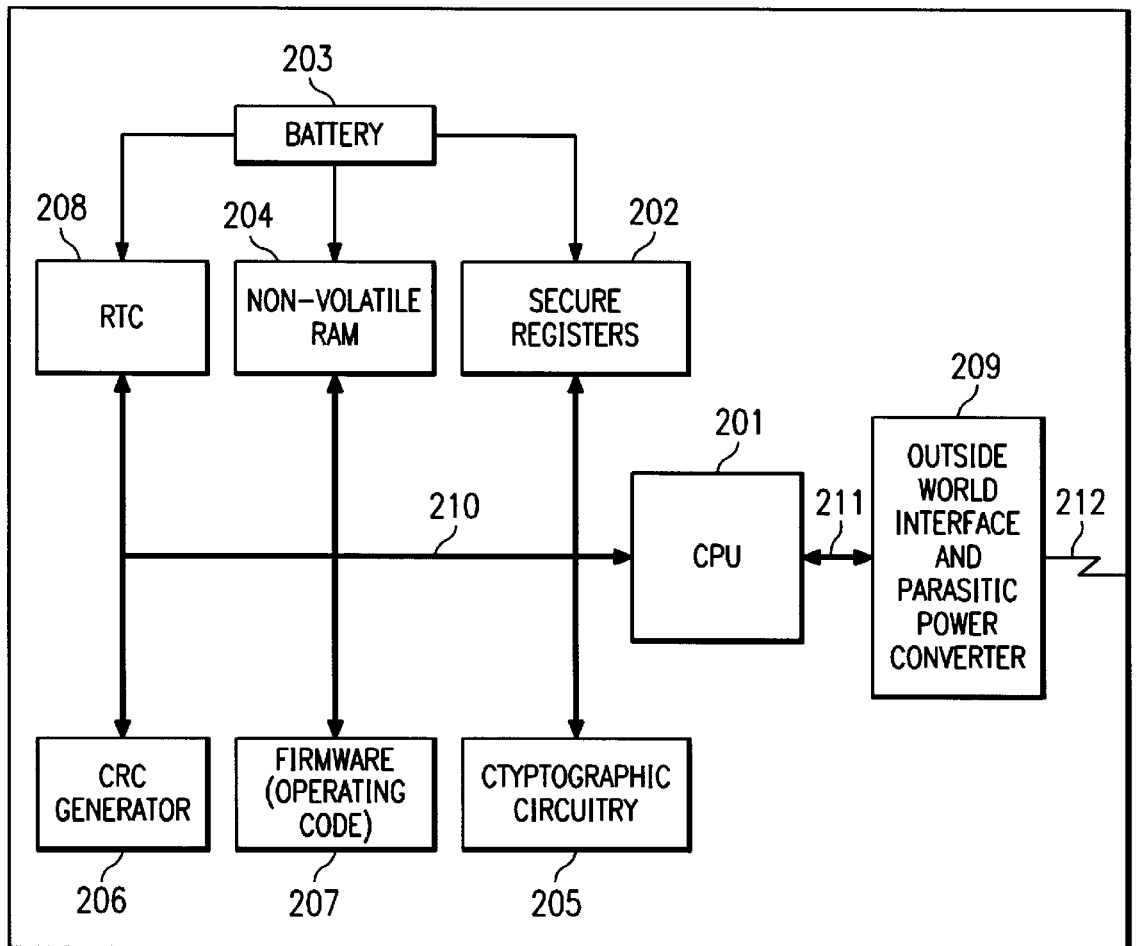
FIG. 2 illustrates the architecture for the preferred embodiment of the portable processor device.

Directing attention to FIG. 2, a block diagram of the various components of a preferred embodiment of portable processor device 18 can be seen. The portable processor device includes a microprocessor contained in a sealed carrier, such as the metal can of the preferred portable processor button, with several other "hybrid" components which enhance its usefulness in providing secure, fault tolerant, transactions.

Central processing unit (CPU) 201 may be any CPU providing sufficient processing capability to impart the functionality discussed herein. Preferably, however, CPU 201 is a more efficient copy of the original 8051 microprocessor of Intel Corporation. Like most microprocessors, CPU 201 executes instructions in sequence out of a memory, in this case, operating code is provided in read only memory (ROM) 207. ROM 207 may provide any amount of storage space necessary for storing the operating code. In a preferred embodiment, ROM 207 provides 8K of ROM. Of course, rather than read only memory, the operating code may be stored in any means of non-volatile memory such as NVRAM 204 discussed in more detail below.

Any process which has been programmed into a CPU will also require data to represent various control aspects of its task. However, semiconductor random access memory (RAM) loses its contents once power is removed from it and, thus, is volatile nature. Therefore, most of the data for the portable processor devices is kept in non-volatile random access memory (NVRAM) 204. In order to maintain the contents of the NVRAM between uses of the portable processor device, a small battery 203 with a life of 10 years is present. Of course, other types of non-volatile memory may be utilized, if desired.

Although any amount of RAM may be provided for utilization by the present invention, the preferred embodiment includes 3K of NVRAM. This amount of NVRAM has been found sufficient to store such information as specific user information, transaction information, passwords, and value credit information utilized in preferred embodiments of the present invention.

Also included are registers 202 for various uses as discussed herein. In addition to the normal registers which are part of the 8051-like architecture of the portable processor device, there are several other registers which provide such features as timed access to particularly sensitive memory locations (such as the location of a cryptographic key). Another register is used for sequence checking of the operating code of the portable processor device. This feature provides confidence that the code is executing in the proper sequence and has not somehow jumped out of its normal path of execution because of an anomaly of programming or due to tampering. Another register includes real-time clock (RTC) information which gives the button self-sufficiency in knowing what the current time is relative to its expiration date and also as an unimpeachable (in the sense that it can not easily be externally tampered with) source of date/time stamping.

Additional registers might include a date and/or time at which the portable processor device is to become disabled unless re-authorized by an issuing authority. Likewise, registers may include cryptographic keys, from which to provide secure data communication or digital signatures, portable processor identification information, such as a unique serial number or license number assigned to the device. Similarly, registers may be utilized to store historical information regarding transactions conducted utilizing the portable processor device for later comparison/verification with information available independently, such as from an issuing authority's central database.

In addition to the above, registers 202 preferably include both atomic transaction registers and device state registers. The use of these registers forms an important part of the provision of fault tolerant transactions according to a preferred embodiment of the present invention and, thus, will be described in detail below.

Although shown having battery 203 providing power, and thus non-volatility, to registers 202, it shall be appreciated that the information stored in some or all such registers may in fact achieve non-volatility through permanent or semi-permanent storage such as within read only memory. For example, although illustrated separately, registers may in fact comprise a portion of ROM 207. Likewise, registers may also comprise a portion of NVRAM 204, if desired. The primary consideration in the embodiment of the registers of the present invention is that they be provided non-volatility and at least some of the registers require restricted access so as to avoid unauthorized tampering.

Several other special features are included in the preferred embodiment of the portable processor device for use according to the present invention. Cryptographic circuitry 205 is provided to allow the use of cryptography in communicating between the portable processor device and the remainder of the world. For example, cryptographic circuitry 205 may include RSA cryptography algorithms for use with public and/or private cryptographic keys. Accordingly, data communicated between the portable processor device and a remote system may be digitally signed by either for use in authentication of the source.

Cryptographic circuitry 205 preferably includes a 768-bit multiplier circuit which can multiply two 768-bit operands in extremely high speed. Such circuitry is useful in accelerating the cryptographic chores which are necessary in securing communications between host system 10 and portable processor 18 as well as communications between system 10 and remote system 20. Likewise, cryptographic circuitry 205 preferably includes a random number generator (not shown), also for cryptographic algorithm use.

One feature, not specific to this system, but necessary all the same is an interface between the internal components of portable processor device 18 and the outside world. Preferably, such an interface is provided through the use of a universal asynchronous receiver transmitter (UART) circuit provided in interface 209. Preferably, the UART provides "one wire" communication. This UART makes contact with host systems via link 212 which, in the case of the preferred embodiment portable processor button, is a conductor in communication with the metal case surrounding the button. This metal case must come in contact with an interface circuit bus which is ultimately connected to a system 10 via means well known in the art, such as through a PC serial communications port or a PC parallel printer port. The use of the one wire UART allows the use of a "one wire bus" connection to the host system (it should be appreciated that the one wire bus may include not only the single data line, but also a second conductor providing signal ground). The UART takes care of the task of sending and receiving bytes of information and informing the CPU of its status.

Of course, in alternative embodiments, the interface may be provided through capacitive or Hall effect coupling. Likewise, any contact or non-contact type interface providing sufficient bandwidth and reliability may be used according to the present invention.

The interface providing the connection of the portable processor to system 10 may include circuitry arbitrate data communication. For example, where the portable processor button utilizes a UART to communicate through a PC parallel printer port, interface 172 may include circuitry to convert data between parallel and serial protocols. Moreover, the interface may also include additional circuitry, such as to allow the unaffected use of the port by the host for another purpose, i.e., also allow the use of a printer attached to the same PC port.

Another function of the interface circuit of the portable processor is to take "parasitic" power from the host interface. This parasitic power is the voltage and current actually used to give the CPU and other circuitry the power it needs to function at high speed without the need to draw on the internal battery for anything but keeping the contents of the RAM and the real time clock register live.

In addition to the above, interface 209 may also include a limited amount of memory in order to provide buffering of data communication between the portable processor device and the outside world system in communication therewith. Of course, such buffer memory may in fact be a portion of NVRAM 204, or other memory area, mapped for use as buffer memory.

Other features included within the portable processor device are RTC 208, providing secure current date and time information, and cyclic redundancy check (CRC) generator 206, for use in verifying the integrity of data received from the system 10. Portable processor device 18 may also include circuitry to detect unauthorized tampering, such as intrusion detection circuitry and/or temperature sensors. Likewise, the portable processor device may include duplicitous circuitry in order to provide additional fault tolerance and/or verification or recovery from anomalous conditions.

Bus 210 is shown connecting substantially all of the internal devices of the portable processor together so that they can function as a unit. However, CPU 201 is illustrated as coupled to interface 209 via bus 211. It shall be appreciated that illustration of bus 211 as isolated from bus 210 is to more readily illustrate that access to the various components of portable processor 18 by outside world devices is restricted. This is not to say that certain aspects, such as particular devices or portions of devices deemed unsecured, may not be made directly available to the outside world, such as system 10 or remote system 20. However, certain devices and/or portions of devices, such as registers, memory addresses containing value credit, and cryptographic circuitry, are available only internally to the portable processor device and thus provide functionality to the outside world indirectly through CPU 201.

PORTABLE PROCESSOR DEVICE INITIALIZATION

As described above, the portable processor device of the present invention may consist of a general purpose processor device which, as produced, includes certain necessary components for utilization as a secure portable processor according to the present invention. Preferably, however, upon initialization a "raw" general purpose processor device will be adapted to substantially permanently operate as a secure portable processor device according to the present invention. For example, program structure including a limited number of commands will be downloaded to firmware in the portable processor. Likewise, memory areas and cryptographic keys will be initialized in the device. Upon completion of initialization, the ability to change this initialization information will be "locked down," or irreversibly established, in order to unalterably define the general purpose processor device as a portable processor of the present invention.

Preferably, these initialization steps are accomplished in the secure environment of an issuing authority so as to provide secrecy with respect to the particular configuration aspects of the portable processor device. Of course, such initialization may be done at some other site, such as at a user's site, such as through remote communications, if desired.

In the preferred embodiment, initialization of the portable processor device for use according to the present invention begins with a determination that a "raw" portable processor device is in communication with an initialization system. Such an initialization system may be embodied, for example, in a system such as system 10 having an initialization program operating thereon.

Thereafter, operating instructions transferred to the internal read-only-memory of the portable processor device. These operating instructions define a limited set of commands to which the portable processor device will be responsive. Moreover, these commands are each associated with a predefined algorithm so as to cause predefined interaction with the various components of the portable processor device and communicate data accordingly with the outside world. Once loaded, these operating instructions are unalterably stored so as to securely define the operation of the portable processor device as that of a portable processor device of the present invention.

Additionally, initialization allocates the various memories/memory areas wherein information utilized by the present invention will be stored. Such allocation may include both the mapping of the various portions of memory to be utilized by particular data, as well as establishing certain of these areas as secure, i.e., not accessible to the outside world, such as through their identification in the operating code. Moreover, some of the memory areas, such as particular registers, may be initialized with data values. For example, the current date and time may be stored, in order to accurately initialize the internal real time clock, or identification information unique to the particular portable processor may be stored.

It shall be appreciated that, after the original initialization process, many of the aforementioned memory areas and registers will not be susceptible to direct alteration by outside world influence. These memory areas and registers will only be alterable in the limited circumstances provided for by the operating code of the now initialized portable processor device.

Of course, certain memory areas and/or registers may be designated as unsecured to allow for substantially direct alteration of their contents by outside world systems, if desired. For example, a portion of NVRAM 204 may be provided for storage of default communication preferences of a user. As such information is typically not important to the security of the transactions, this information may be stored in the portable processor such that updating by a user is easily accomplished.

PORTABLE PROCESSOR AUTHORIZATION

In order to utilize any particular portable processor device according to a preferred embodiment, a user will be required to receive authorization. The authorization process is to set up the secure device for use by a particular user and/or for particular purposes according to the present invention. As discussed in detail below, authorization preferably includes the storage of certain information within the portable processor itself, such as information about the owner or user of the device including his/her name, a registration or license number and other information about the owner such as the user's address and password. Additionally, authorization preferably includes recording certain information, such as identification of the portable processor device or the identification of a particular user associated with a portable processor device, at a centralized database for use in validating subsequent transactions.

Authorization may be performed as a single function along with the aforementioned initialization of the portable processor device. However, as initialization involves the initial configuring of the portable processor to operate in accordance with the present invention, that function is preferably performed within a physically secure environment. Contrariwise, as authorization of the portable processor device involves integration of data specific to the particular user of the portable processor device, this function is preferably performed by or with the assistance of the end user. Accordingly, in the preferred embodiment the initialization and authorization functions are performed as two separate steps to accommodate the opposing considerations of each function.

Of course, authorization may be performed with the aid of the end user either at an issuing authority's location, or at the end user's location. In order to provide information to the issuing authority regarding the user information as well as other useful information, such as a serial number of the user's program utilized to interface with the portable processor device or cryptographic keys generated using a user provided password or seed, information must be communicated from the user to the issuing authority. Such communication may be accomplished by many methods. One such method utilizing a printed registration form is described in co-pending and commonly assigned application Ser. No. 08/515,988, now U.S. Pat. No. 5,801,364 entitled "SYSTEM AND METHOD FOR CONTROLLING THE STORAGE OF DATA WITHIN A PORTABLE MEMORY," previously incorporated herein by reference. However, a preferred embodiment of the present invention utilizes remote communications such as the fault tolerant secure communications described herein.

Authorization is accomplished by coupling the portable processor device to a portable processor device receptor (interface) coupled to a processor based system, such as illustrated in FIG. 1A. The processor based system operates under control of a program which solicits the proper information from the end user and negotiates communications with the portable processor device. Preferably the authorization program is a portion of the aforementioned E-STAMP program but, of course, may be embodied in a separate program.

The authorization program requests that the user prepare the following information: the user's full name and address, an identification number for the user (i.e., an employer identification number (EIN#), if the user is a business or organization; or a social security number (SS#), if the user is an individual), the user's zip code, the user's telephone number and the user's fax number. Of course, the particular information solicited from the user may vary depending on the particular use anticipated for the portable processor device. The aforementioned information is directed toward the use of the portable processor device in storing postage credit and providing postage meter stamp indicia.

The user-specific information is then entered by the user into the authorization program. Once the user has entered the user-specific information, the program preferably warns the user to carefully verify the correctness of the entered information.

After verifying the information added into the authorization program, the authorization program will preferably verify that the proper peripheral devices are connected and operating in order to communicate the appropriate information to the issuing authority. The user information entered into the authorization program will then be incorporated into the proper memory areas and/or registers of the portable processor device as well as properly formatted and communicated to the issuing authority. It shall be appreciated that storage of the information within the portable processor device requires that the authorization program communicate the user information as well as issue the proper commands of the limited command set, as described above, to the portable processor. Thereafter, the portable processor controls the storage of the user information according to its internal operating code. Likewise, where communication of the user information to the issuing authority is conducted remotely, the information is formatted by the portable processor and negotiated with the remote system as is described in detail below.

In a preferred embodiment, the information provided to the issuing authority upon authorization of the portable memory device includes information such as the portable processor button serial number, the E-STAMP (or other controlling program) serial number, the date and time that the E-STAMP program was installed, and user-specific information (e.g., name, address, telephone and fax numbers, and identification number).

Additionally, in a preferred embodiment of the present invention, the portable processor devices are specially manufactured for use in conjunction with the present invention, i.e., unique serial numbers specific to the program are embedded within each portable processor button. These serial numbers may also be included in the information provided to the issuing authority to be recorded in the user registration database. Thus, additional security is provided since only the portable processor devices specially manufactured for use with the present invention are able to used.

When the issuing authority, or other system administrator, receives the authorization information from the user, the information is transferred to a registered user's database, such as database 24 illustrated in FIG. 1A. The valid entry of the user registration information in the database ensures that transactions conducted using the portable processor device will pass verification at remote systems in communication with the database.

When the user information has been transferred to the registered user's database, registration information, such as a serial number or license number, may be communicated back to the portable processor for confirmation of completion of the authorization of the portable processor. In addition to providing confirmation that the authorization of the portable processor has been completed, such license number information may also be utilized to restrict the use of the portable processor device. For example, the license number may indicate that the device is limited to use in a certain predefined area, or certain context. Accordingly, the information may be utilized internally to the portable processor device to determine if a particular transaction or command should be acted upon. Likewise, the license number may be transmitted in communications with outside world systems for their use in determining the propriety of performing a particular transaction.

It shall be appreciated that the aforementioned authorization may not only be required upon placing of the portable processor device in service, but may also be required subsequently. For example, depending on the desires of the particular issuing authority, the portable processor device may include a feature whereby it is disabled upon the expiration of a certain amount of time from a previous authorization. Thereafter, subsequent authorization may be necessary to restore the portable processor device to service. Likewise, authorization may be invoked as a part of particular transactions, such as the transfer of value credit to the portable processor device. Such periodic authorization is advantageous in periodically allowing the issuing authority to verify the contents and operability of the portable processor device. Verification might include reference to various memory and register contents to detect fraud or misuse.

CONDUCTING DESIRED TRANSACTIONS

Once successfully, initialized and authorized, the portable processor device may then be utilized in conducting robust, fault tolerant, trusted transactions between a host processor based system, such as system 10 of FIG. 1A, and/or a remote system, such as a remote system 20 of FIG. 1A. As it is anticipated that the present invention will be utilized in conducting financial transactions, such as the transmission of pecuniary credit values, preferably the remote system is itself a secure system operated by a trusted party to the transaction. However, it shall be appreciated that the host processor based system and/or the communication path utilized according to the present invention may both be unsecured. Accordingly, the present invention utilizes the secure environment of the portable processor device and a predefined communication protocol in order to negotiate transactions remotely between the portable processor device, host system and/or a remote system.

In financial transactions, such as those which might advantageously be conducted according to the present invention, it is desirable that there be only two possible outcomes. In the event that all actions required to authorize the transaction are successful, a transaction is allowed. If any of those actions fail, then the transaction is rejected, and the financial system should be placed in its original state (i.e., any credit value demarcated as reserved in anticipation of the completion of the now failed transaction should be released etcetera).

Some typical transactions may be broken down into the components as identified below:

Transactions involving acceptance of additional financial value at a financial value vault (i.e., the portable processor device of the present invention) require a set of processes or procedures to securely increase the financial value stored therein. Such processes might typically include:

1. Transmission of a financial instrument bearing financial value from an issuing object directed toward a particular vault;
2. Receiving the financial instrument at the vault;
3. Authenticating the instrument's origin;
4. Authenticating the instrument's destination;
5. Applying the instrument's financial value to the vault;
6. Ensuring that the instrument is not reused for the same purpose;
7. Generating proof of successful transaction completion; and
8. Transmission of proof of completion from the vault to the issuing object.

It shall be appreciated that the above processes may be broken down into processes which preferably occur within the secure environment of the vault (i.e., processes 2–5 and 7), processes which preferably occur within the secure confines of the issuing object (i.e., processes 1 and 8), and processes which preferably are accomplished with cooperation from both the vault and the issuing object (i.e., process 7).

Transactions involving dispensation of financial value from a financial value vault (i.e., the portable processor device of the present invention) require a set of processes or procedures to generate a financial instrument from the financial value stored therein. Such processes might typically include:

1. Transmitting a request to generate a financial instrument from a dispensing object directed toward a vault;
2. Receiving the request at the vault;
3. Decreasing the vault's financial value by the requested amount;
4. Generating a financial instrument for the requested amount; and
5. Transmitting the instrument to the dispensing object (also may be utilized as proof of successful completion of the transaction).

As above, the above processes may be broken down into several categories. However, as the nature of the transaction only requires interaction of a single secure device, here the vault, the categories are slightly different than above. Such categories of processes include those which preferably occur within the secure environment of the vault (i.e., processes 2–4) and processes which preferably occur outside the secure confines of the vault (i.e., processes 1 and 5).

In the event that any one of the above actions fail, or are intentionally or unintentionally interrupted, the issuing object and/or vault should either later attempt to complete the actions or revert back to their original state. If the actions are not completed the instrument's value mu-st be restored, and proof of successful completion of the transaction must not be generated, otherwise ambiguity would exist as to the proper value of the credit stored within the vault. In order to assure successful completion of the transaction or reversion to a former state, the present invention utilizes a set of protocols defining both atomic transactions, i.e., the smallest number of actions which must be performed to provide a complete transaction, within the portable processor device itself (internal atomic transactions) as well as fault tolerant communication of transaction processes with outside world devices (external atomic transactions) such as the aforementioned remote systems.

Atomic transactions according to the preferred embodiment of the present invention include a request and a commit. The request is generated by the client and the server provides a transaction command for the client in response to the request. Upon processing the transaction command, the client provides a commit to close the transaction. Accordingly, fault tolerance, i.e., either completed transactions or resetting to a previous state, may be provided through a protocol where a new request for a subsequent transaction will not be generated if a previous request has been generated which has not received a transaction command from the server. In such a case the system desiring the transaction, such as the host system E-STAMP software, will be made aware of the situation to act accordingly, such as re-transmit the outstanding request to the server, in order to complete the previous transaction or request an abort and resetting to a previous state.

Additionally, when the server receives a request from a client, if the server has not received a commit corresponding to a previous transaction, the server will make the system desiring the transaction aware of the situation. For example, the server may re-transmit a command packet for the previous transaction that has not been committed yet in order to invoke a commit.

It shall be appreciated that in either of the above situations (the client directed to generate a request when a previous transaction command has not been received or the server detecting a request when a commit has not been received) the present invention may respond to the subsequent desired transaction in a number of ways. The present invention may operate to complete the previous transaction or roll back the device(s) to a prior state and inform a user of such without conducting the subsequent transaction (necessitating user intervention to conduct the subsequent transaction). This result may be preferable in cases where the previous transaction impacts upon conducting a subsequent transaction, such as where a previous transaction was to refill a credit value in the portable processor device. Alternatively, the present invention may operate to complete the previous transaction or roll back the device(s) to a prior state, preferably informing a user of such, and continuing to conduct subsequent transaction (operating substantially transparent to a user desiring the subsequent transaction). This result may be preferable in cases where the previous transaction does not significantly impact the subsequent transaction, such as where a previous transaction was to issue a value indicia from the portable processor device.

For example, in the above identified exemplary transaction of accepting additional financial value, a portable processor device (client in this scenario), initialized and authorized as discussed above, at the direction of host software (system desiring the transaction in this scenario), such as the aforementioned E-STAMP program, can request additional financial value through electronic communications such as illustrated in the system of FIG. 1A. Upon receiving and authenticating such a request, preferably using cryptographic keys, the remote system (server in this scenario) generates a financial instrument (transaction command) intended for the requesting portable processor device. This instrument is downloaded into the portable processor device, which then authenticates that the originating party was a proper remote system, i.e., authorized by the issuing authority, and that the instrument was intended for the portable processor device, preferably through the use of cryptographic operations. The portable processor device then applies the value of the instrument to itself and generates a proof of completion (commit), again preferably using cryptographic operations. If the transaction is interrupted or any process within the transaction fails, the portable processor device may re-transmit the request to complete the transaction or revert back to its original state and value, communicating an abort message to the remote system.

When a transaction is conducted over an unsecured communication path, such as the Internet or public switched network (PSN), the portable processor device operates according to a predetermined protocol to conduct the transaction in order to avoid any ambiguity in the value of the credit stored within the portable processor device or any uncertainty of the final state of the device. The predetermined protocol includes the use of atomic transactions within the portable processor device, in addition to a predefined scheme of communication with the remote system as will be discussed in detail hereinbelow.

To provide security for the transmission of data in performing transaction processes according to the present invention, various security features of the portable processor may be utilized. Initially, it is noted that the portable processor device provides a physically secure environment for the processor, memory, firmware, etcetera in operation of the present invention. Moreover, information fields, such as the aforementioned cryptographic keys, user identification, current date and time, number of transactions that have taken place on the device, serial number of the device, etcetera are utilized alone or in combination to provide for the use of externally communicated data only by the proper portable processor or remote system. For example, cryptographic keys may be utilized by the portable processor device and remote system to digitally sign or confirm the signature of data communicated therebetween. Similarly, device serial number and transaction number information may be utilized by the portable processor to ensure that particular data is usable only with a particular portable processor for a particular transaction or for comparison by a remote system with a database of authorized portable processors.

Additionally, when a desired transaction is accomplished using the portable processor device, recorded transaction information can be analyzed either from the perspective of management information or to detect fraud. This allows for authentication or verification at a point remote (both physically and electronically) from the user and remote from the host and even remote from the portable processor device.

ATOMIC TRANSACTIONS WITHIN THE PORTABLE PROCESSOR DEVICE

Atomic transactions, although possibly involving any number of component transaction processes, or actions, internal to the portable processor device (examples of which are outlined above), appear externally to be a single transaction. Accordingly, each atomic transaction performed by the portable processor is either completed in its entirety, or any component transaction processes performed within the portable processor resulting in a failure to fully complete the transaction are rolled back to place the portable processor in a state as if the atomic transaction was not attempted.

Atomicy is accomplished by implementing various state indicators within the portable processor device which are exclusively under the control of the portable processor and are unavailable to the outside world. Preferably, the state indicators are embodied as particular registers, within registers 202, initialized as described above. State indicators are provided for predefined milestones of the various transactions which will be conducted within the portable processor device. Preferably, these state indicators are utilized to signify that a transaction's operations have commenced, that a transaction's operations have completed, and that a transaction was unsuccessful. Additionally, state indicators may indicate the particular transaction being attempted, as well as user identification of the user requesting the transaction. Such information may be utilized not only to provide atomic transactions, but may also be used in determining causes of transaction failure and/or detection of tampering.

Additionally, in order to provide the ability to roll back the portable processor to a previous state in the case that a transaction is not completed, atomicy according to the present invention utilizes a method to obtain a record of the portable processor device's state prior to commencement of the transaction. Likewise, the present invention utilizes a method to restore the state in the event of a transaction failure. Preferably, the portable processor device utilizes a portion of its memory, such as a predefined portion of registers 202, in order to store a copy of the information to be effected by the transaction prior to any alteration by the processes of the transaction. Accordingly, restoration of the previous state involves the transfer of this prior state information back into the proper memory areas and resetting of any state indicators to a pretransaction condition.

Directing attention to FIG. 3, a flow diagram of an atomic transaction performed according to a preferred embodiment of the present invention is illustrated. According to the present invention, before the commencement of an atomic transaction, various state indicators are checked to determine if a previous atomic transaction has failed (step 301), i.e., whether a commit was generated to close the transaction. If the previous atomic transaction has failed, the portable processor device's prior state is restored as described above (step 302). As discussed above, rather than immediately restoring a previous state, the transaction may be re-attempted, such as through reference to the state registers for the point at which the transaction failed.

Regardless of the failure or completion of a previous atomic transaction, in order to proceed with the current atomic transaction the portable processor devices' state is then recorded (step 303), as described above, and state indicators are set to indicate that an atomic transaction has commenced (step 304). The setting of the state indicators to indicate a particular atomic transaction has commenced may be utilized as the aforementioned request by an internal atomic transaction. Of course, alternative forms of a request may be utilized according to the present invention, such as a predefined data packet preferred in external atomic transactions discussed below.

After setting the state indicators, processes identified with the particular atomic transaction, as determined by the portable processor device's operating code, are executed (step 305). Accordingly, the step or steps of the desired transaction are actually commenced.

Where many individual processes are required in order to accomplish the atomic transaction, milestones are preselected in order to update the status indicators and, thus, reflect progress toward completing the atomic transaction. These milestones are identified in the operating code and their completion is determined during the atomic transaction at step 306. These milestones may be useful in determining which of several memory locations require restoration upon failure of a particular atomic transaction or which processes must be accomplished in order to complete a failed transaction. Similarly, as mentioned above, these milestones may be useful in later determining the cause of the failure or in detecting tampering.

If a milestone of interest is passed, the state indicators are updated accordingly (step 304). If a milestone of interest has not been passed, a determination is made as to whether there are additional processes to perform in conducting the atomic transaction (step 307). The determination of all processes of an atomic transaction being completed may be made through reference to a particular transaction command, as discussed above, indicating completion.

If there are additional processes to be performed, then the next process is performed (step 305). However, if all the processes associated with a particular atomic transaction have been successfully performed, state indicators are again set, however, this time they indicate that the atomic transaction was successfully completed (step 308).

Setting of the state indicators to indicate a particular atomic transaction has completed may be utilized as the aforementioned commit by an internal atomic transaction. Of course, alternative forms of a commit may be utilized according to the present invention, such as a predefined data packet preferred in external atomic transactions discussed below.

It shall be appreciated from the above discussion, that even upon an anomaly occurring which causes the portable processor device to "hang" or freeze in conducting the processes of an atomic transaction, such as its removal from the portable processor device receptor which provides power to the device, upon commencing a subsequent atomic transaction the device will either attempt to conclude the transaction or be reset and allowed to proceed normally. Accordingly, the atomic transactions of the present invention not only provide confidence that an atomic transaction itself will be conducted fully or the device reset to a former condition, but the present invention provides for the recovery of anomalous states and conditions in which a faulty transaction might place the portable processor device. This feature further provides security for the contents of the portable processor device, as unpredictable states may not be used, intentionally or accidentally, as a starting point of a subsequent transaction and thus cause in undesired results from such subsequent transactions.

In addition to providing for atomicy as described above, recording of previous state information may be utilized in providing historical data with respect to the portable processor device. Therefore, in an alternative embodiment of the present invention, upon completion of a transaction or at commencement of a transaction, previous state information associated with a prior transaction is transferred from registers 202 to be stored in NVRAM 204 prior to the current state information being stored in registers 202. Such information might be uploaded from time to time to a host system for tracking usage of the device or for reconciliation with independent records of interaction with other systems also available at the host system. Accordingly, such previous state information may be stored in the portable processor, such as for a predetermined amount of time, for communication to a host.

It shall be appreciated that the atomic transactions discussed above are useful both in conducting external transactions (i.e., completion of the transaction requires communication and/or information external to the portable processor device) with trusted systems, such as where a remote system provides pecuniary value credit for storage in the portable processor device, as well as transactions with open unsecured systems, such as where a host system requests dispensation of a portion of the pecuniary value credit. The atomicy of the transactions conducted according to the present invention provide confidence that, regardless of the particular system interacting with the portable processor device, the state of the device and, therefore the information therein, is predictable and secure.

FAULT TOLERANT EXTERNAL TRANSACTIONS

As described above, when a transaction is conducted over an unsecured communication path, such as via the Internet or PSN, the portable processor device operates according to a predetermined protocol preferably to conduct the transaction in order to avoid any ambiguity in the value of the credit stored within the portable processor device or any uncertainty of the final state of the device. The predetermined protocol includes the use of the aforementioned atomic transactions within the portable processor device, in addition to a predefined scheme of communication with the remote system, thus defining an external atomic transaction.

Preferably, the internal atomic transactions performed by the portable processor are utilized in interacting with the remote system in order to securely perform the desired external atomic transaction. Here, both the portable processor and the remote system store the state of the portable processor as the processes necessary to perform a particular desired external transaction are performed. Accordingly, if a communication error, or other anomaly, interrupts communication according to a particular process, appropriate action may be taken at either or both the portable processor device or remote system to complete the external transaction. Likewise, the storage of such state information facilitates the ability at either or both the portable processor device or remote system for providing roll back of the portable processor device in the case of an irrecoverable error in the completion of the desired external transaction.

Directing attention to FIG. 4, a flow diagram of the steps performed by the portable processor for an external transaction conducted between the portable processor device and an outside world system are illustrated. According to a preferred embodiment of the present invention, before the commencement of an external transaction, various state indicators are checked to determine if a previous external transaction has failed (step 401). If so, the portable processor device operates to abort the previous external transaction (step 402). Aborting the external transaction may include such steps as restoring the portable processor device's prior state and issuing an abort message or data packet to inform a remote system of the aborted external transaction. However, depending on the particular external transaction aborted, it may be advantageous to cause the portable processor to become non-functional, possibly accompanied by transmission of an abort message, in order to prevent fraud or tampering. Likewise, it may be advantages to re-attempt the last atomic transaction, such as through reference to the state registers for the point at which the transaction failed, in an effort to complete the failed external transaction. As discussed above, rather than immediately restoring a previous state, the transaction may be re-attempted, such as through reference to the state registers for the point at which the transaction failed.

If the aborted external transaction is not one which causes the device to become non-functional, or if the previous external transaction is not still pending, in order to proceed with the current external transaction the portable processor devices' state is then recorded (step 403), as described above. Thereafter, state indicators are set to indicate that an external transaction has commenced (step 404).

Processes identified with the particular external transaction are executed (step 405). Execution of these processes may include the generation and transmission of a data packet, comprising the aforementioned request, to the remote system. In a preferred embodiment, a first executed internal atomic transaction operates to generate and transmit a request. However, it is not necessary that the generation and transmission of a request of the present invention be such a transaction. For example, information suitable for use as the request may be communicated to the proper remote system ancillary to or simultaneously with the recording of the current state information.

In a preferred embodiment, the processes are themselves atomic transactions as described above. Of course, a particular external transaction may utilize processes which are not atomic transactions, if desired. However, as fault tolerance and security, according to the present invention, relies at least in part on the atomicy of transactions within the portable processors, it is preferred that only processes not critical to performance of the external transaction be utilized as non-atomic transactions.

As it is anticipated that an external transaction will involve several processes, preferably atomic transactions, within the portable processor device ancillary to or in addition to the interaction with an external system, the status indicators are updated (step 406) to reflect completion of such processes (atomic transactions). This information indicates the extent to which the external transaction was performed in order to determine the steps necessary in order to complete the external atomic transaction or to roll back to a previous state. Additionally, such information is useful in determining whether the external transaction was performed to an extent requiring the transmission of an abort message or other means of synchronizing the state at a remote system. Similarly, as mentioned above, this information may be useful in later determining the cause of the failure or in detecting tampering.

Next, a determination is made as to whether there are additional processes (atomic transactions) to perform in conducting the external transaction (step 407). The determination of all processes of an external atomic transaction being completed may be made through reference to a particular transaction command, as discussed above, indicating completion. It shall be appreciated that the transaction command may be a data packet provided by the remote system in response to the request, such as might include a requested amount of pecuniary credit or other desired information. Alternatively, the transaction command may be a data packet serving no purpose except to acknowledge successful receipt of the request, such as might be provided in addition to a data packet including requested information. The latter form of transaction command is preferable where the request is for an operation of the remote system which does not typically result in a return of information to the portable processor device.

If there are additional processes to be performed, then the next process is performed (step 405). However, if all the processes associated with a particular external transaction have been successfully performed, the transaction pending indicator is updated to reflect no transaction currently pending (step 408).

Setting of the state indicators to indicate the external atomic transaction has completed may include the generation and transmission of a data packet, comprising the aforementioned commit, to the remote system. In a preferred embodiment, a last executed internal atomic transaction operates to generate and transmit a commit. However, it is not necessary that the generation and transmission of a commit of the present invention be such a transaction. For example, information suitable for use as the commit may be communicated to the proper remote system ancillary to or simultaneously with the updating of the state indicator information.

The above steps associated with conducting an external transaction within a portable processor device may be utilized both with external transactions with a trusted remote system, such as remote system 20, as well as an unsecured system, such as host system 10. It shall be appreciated that, in conducting external transactions according to the present invention, the generation and transmission of a commit from the portable processor device may be unnecessary where the atomicy of the transaction is not a concern with the remote system. For example, where the external transaction is the transmission of housekeeping information, such as transaction history information, from or to the portable processor device it may be irrelevant to the remote system as to whether the transaction completed. However, it may be important from the portable processor's point of view, such as in determining if such information should be retained for future transmission. Accordingly, the portable processor device may maintain atomicy even in the absence of the external system doing so. Where the external device is not maintaining atomicy, the use of information communicated in response to the request as the transaction command, as discussed above, may be necessary.

In conducting external transactions with a trusted remote system, or other system maintaining atomicy, in order to provide fault tolerance and/or security according to the present invention, the remote system operates according to a predefined protocol. Directing attention to FIG. 5, a flow diagram of the steps associated with the conducting of an external transaction as operable at a remote system are illustrated. According to a preferred embodiment of the present invention, before the commencement at a remote system of an external transaction with a portable processor device, such as may be instigated by receipt of a request, various state indicators are checked to determine if a previous external transaction has failed (step 501). Preferably, the remote system verifies whether a commit has been received corresponding to a previous request. If the previous transaction has not completed, the remote system determines if an external transaction abort message has been received (step 502) (i.e., a determination is made as to whether the current transaction is an abort message).

If no abort message has been received from the proper portable processor device, the remote system denies the external transaction (step 503) and ends further processing with respect to this portable processor. Alternatively, the remote system may re-transmit the previous transaction command in an effort to complete the transaction.

It shall be appreciated that a requested external transaction in light of a pending external transaction is illustrative of undesired conditions such as a malfunctioning portable processor device or attempted fraud. Accordingly, in a preferred embodiment the present invention operates to terminate further processing with respect to this particular portable processor to ensure security etcetera. Alternatively, a limited number of re-transmissions of the transaction command may be attempted in order to assure a correctable communication error or the like is not causing the interruption. Of course, where such issues are not a concern, the remote system may simply restore the previous state even after repeated attempts to re-transmit the transaction command and proceed with the external transaction as discussed hereinbelow.

If an abort message has been received from the portable processor device, the previous state associated with the particular portable processor device is restored (step 504). Such restoration may involve rolling back certain transaction information, such as deduction of credits unsuccessfully transmitted to the portable processor device. Similarly, state restoration may involve simply resetting the transaction pending status to indicate the pendency of the current external transaction rather than the previous transaction.

If the aborted external transaction is not one which causes the remote system to terminate the external transaction with respect to this particular device, or if the previous external transaction is not still pending, in order to proceed with the current external transaction the portable processor device's state is then recorded (step 505). Recording of the current device state by the remote system may include storage of either or both information contained within the portable processor device, such as might be included in the communication, i.e., the request, from the device, and information associated with the particular device which is stored by the remote system, such as a credit balance from which the value of a financial instrument is to be deducted.

Additionally, state indicators are set to indicate that an external transaction associated with the particular portable processor device has commenced (step 506).

Processes identified with the particular external transaction are executed (step 507). It shall be appreciated that, as the remote system is expected to be implemented in a physically secure environment associated with the issuing authority, atomicy of the remote system's transactions is not as critical for security reasons. However, as described above, when conducting financial transactions, such as transferring an amount of credit, it is desirable to ensure completion of such transactions in order to avoid undesired cases such as deduction of credit never successfully transmitted to the portable processor device. Therefore, in a preferred embodiment, the processes are themselves atomic transactions as described above for the portable processor device.

As it is anticipated that an external transaction will involve several processes, a determination is made as to whether there are additional processes (preferably atomic transactions) to perform in conducting the external transaction (step 508). If there are additional processes to be performed, then the next process is performed (step 507). However, if all the processes associated with a particular external transaction have been successfully performed, the transaction pending indicator is updated to reflect no transaction currently pending for the particular portable processor device (step 509).

Preferably, the final processes of the external transaction as performed by the remote system include transmission of a transaction command to the portable processor device and the receipt of a commit from the portable processor device indicating the external transaction has been completed. However, as described above, the result of the processes transmitted to the portable processor device may be utilized as the transaction command. Accordingly, the remote system may operate to update the transaction pending indicator to reflect the transmission of the transaction command only to be updated to reflect completion of the external transaction if and when a commit is received from the portable processor device.

EXEMPLARY TRANSACTION

In order to better understand the operation of the present invention as outlined above with respect to the flow diagrams for the portable processor device and remote system, description of the below exemplary transaction is offered. However, it shall be appreciated that the present invention is not intended to be limited to performing the transaction described and, in fact, many similar and dissimilar transactions may be accomplished according to the principles of the present invention.

As an example, a transaction involving acceptance of additional financial value at the portable processor device will be described as this particular transaction involves both the use of atomic transactions and external transactions. Referring again to FIG. 1A, a user of system 10 will typically indicate a desire to increase the value of credit stored within portable processor device 18 through data input, such as via keyboard 15. Under control of the aforementioned E-STAMP program, or its equivalent, system 10 operates to communicate the desire to conduct the transaction to portable processor 18. Preferably, this communication is in the form of a command, as selected from the limited command set provided in the portable processor's operating code, accompanied by the appropriate parameters to cause the portable processor to conduct the desired transaction.

Upon receipt of the command to conduct the credit refill transaction (an external transaction since its completion will require receipt of credit value from a remote system) the portable processor proceeds according to the steps outlined in FIG. 4. Accordingly, a check is made to ensure a previous transaction has not failed. Assuming no previous transaction is still pending, the portable processor will record the portable processor's current state information, such as the present value of the credit stored therein. Next the portable processor updates a register to indicate that an external transaction is in process.

As determined through reference to the operating code, the portable processor will conduct a sequence of atomic transactions, as outlined in FIG. 3, directed toward accomplishing the external transaction desired. In our present example, the portable processor will initially perform an atomic transaction to transmit a request for the credit refill to the remote system. This atomic transaction may involve multiple steps such as verification of the system issuing the command, formulation of a data packet to communicate to the remote system, encryption of the data packet, and transmission of the data packet. Additionally, as described with reference to FIG. 3, completion of the atomic transaction includes the recording of current state information and update of state indicators in order to provide for roll back in the case that the atomic transaction is not completed.

As illustrated in FIG. 4, the portable processor device determines if additional atomic transactions are necessary in order to complete the external transaction. In this case additional atomic transactions are required in order to receive the credit as well as acknowledge the receipt of the credit, i.e., transmit a commit. Therefore, after transmission of the data packet, the portable processor proceeds to the next atomic transaction. However, the next atomic transaction includes a step of receiving a response a data packet from the remote system, in this case a data packet containing pecuniary credit information which may also be used as the transaction command. Accordingly, processing at the portable processor device is temporarily suspended in anticipation of receipt of a data packet.

Of course, instead of suspending processing entirely, the portable processor device may operate to "time out" if a suitable response is not received in a predetermined amount of time. This time out feature may be embodied as an initial process in the subsequent atomic transaction which the command associated with the desired external transaction instigates, or may itself be an atomic transaction performed as a portion of the external transaction. Regardless of how it is implemented, the occurrence of a time out may cause the portable processor to retransmit its previous data packet in an effort to complete the external transaction. Alternatively, or in the case of repeated time outs, the portable processor device may invoke an abort atomic transaction to reset the device to its previous state as well as to inform a remote system of its failed external transaction. It shall be appreciated that the host system may also or alternatively manage timeouts, re-transmissions, and aborts, if desired.

Figure 5:
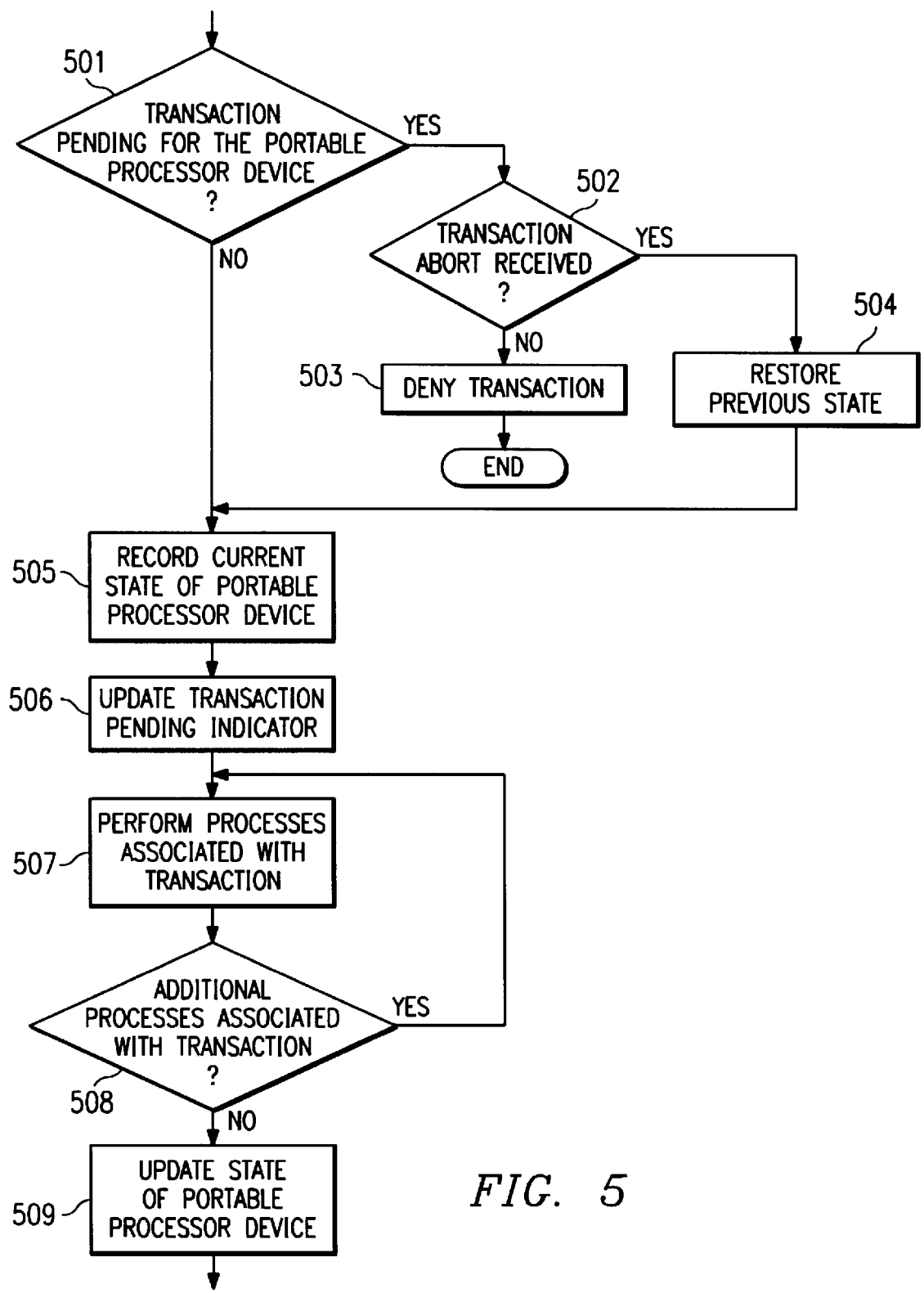
FIG. 5 illustrates a flow diagram for performing an external transaction by a remote system of the present invention.

Upon receipt of the data packet transmitted from the portable processor device, the remote system operates according to the steps of FIG. 5. Accordingly, the remote system will determine if an external transaction is pending for the portable processor device. Assuming one is not, the remote system will proceed to record state information associated with the portable processor. This state information may include information included in the communication from the portable processor device, such as the value of credit presently stored in the device, as well as information stored by the remote system, such as the value of a credit balance associated with the particular user or portable processor device.

The remote system also operates to update its transaction pending indicators associated with the portable processor, in order to later detect the failure of the present external transaction.

The remote system will then conduct a sequence of, preferably atomic, transactions, directed toward accomplishing the external transaction desired. In our present example, the remote system will initially perform an atomic transaction to transmit an amount of credit refill to the portable processor device. This atomic transaction may involve multiple steps such as decryption of the received data packet verification of the portable processor requesting the credit refill, deduction of value from the credit available at the remote system, formulation of a financial instrument data packet to communicate the credit to the portable processor device, encryption of the data packet, and transmission of the data packet. Additionally, as described with reference to FIG. 5, completion of the atomic transaction includes the recording of current state information and update of state indicators in order to provide for roll back in the case that the atomic transaction is not completed.

As illustrated in FIG. 5, the remote system determines if additional atomic transactions are necessary in order to complete the external transaction. In this case an additional atomic transaction acknowledging the receipt of the credit by the portable processor device by receipt of a commit is required. Therefore, after transmission of the data packet, the remote system proceeds to the next atomic transaction. However, the next atomic transaction includes a step of receiving a commit a data packet from the portable processor device. Accordingly, processing is temporarily suspended, with respect to the portable processor device, in anticipation of receipt of a data packet.

As described above, instead of suspending processing, the remote system may operate to "time out" if a suitable response is not received in a predetermined amount of time. This time out feature may be embodied as an initial process in the subsequent atomic transaction, or may itself be an atomic transaction performed as a portion of the external transaction. Regardless of how it is implemented, the occurrence of a time out may cause the remote system to retransmit its previous data packet in an effort to complete the external transaction.

However, in a preferred embodiment, the remote system does not time out, but rather is open to requests for the latest transaction command (i.e., re-transmitted requests from a portable processor device or its coupled host when an expected transaction command was not received) until a commit is received. Alternatively, the remote system may abandon the external transaction. It shall be appreciated that the remote system does not abort the transaction and restore the previous status as does the portable processor, because the communication might be intercepted subsequent to the portable processor accepting and integrating the transmitted credit. Therefore, the preferred embodiment merely holds the transaction open or abandons the transaction in either case requiring the portable processor to either establish that it did not receive the credit (which can easily be established through communications with the portable processor device because of its secure nature) or later instigate an external transaction which, if not preceded by an abort (indicating the portable processor device did not receive the credit), will cause the state at the remote system not to reset. In either of the above circumstances the result is that the proper credit will be reflected at the remote system and the portable processor device.

Upon receipt of the financial instrument data packet transmitted from the remote system, the portable processor continues operation of the next atomic transaction according to the steps of FIGS. 3 and 4. Accordingly, the portable processor device will, in our present example, operate to decrypt the received data packet, verify that a proper data packet has been received, that it is intended for the portable processor device, increment the credit stored therein by the amount of the data packet, formulate a data packet indicating successful completion of the credit refill, and transmit acknowledging data packet to the remote system. Additionally, as described with reference to FIG. 3, completion of the atomic transaction includes the recording of current state information and update of state indicators in order to provide for roll back in the case that the atomic transaction is not completed.

As illustrated in FIG. 4, the portable processor determines if additional atomic transactions are necessary in order to complete the external transaction. In this case no additional atomic transactions are required. Therefore, after transmission of the data packet, the portable processor proceeds update the transaction pending indicator to reflect successful completion of the external transaction.

Of course, rather than concluding the external transaction with the transmission of the acknowledgment, the portable processor could operate to perform an additional atomic transaction, such as await a subsequent acknowledgement from the remote system, if desired.

Upon receipt of the acknowledgement (commit) data packet transmitted from the portable processor device, the remote system continues operation of the next atomic transaction according to the steps of FIG. 5. Accordingly, the remote system will, in our present example, operate to decrypt the received data packet, verify that a proper data packet has been received, and that it acknowledges successful completion of the credit refill transaction.

As illustrated in FIG. 5, the remote system determines if additional atomic transactions are necessary in order to complete the external transaction. In this case no additional atomic transactions are required. Therefore, after receipt of the acknowledgement data packet, the remote system proceeds to update the transaction pending indicator to reflect successful completion of the external transaction.

Of course, rather than concluding the external transaction with the receipt of the acknowledgment, the remote system could operate to perform an additional atomic transaction, such as transmit a subsequent acknowledgement from the portable processor, if desired.

Although the above transaction example has been discussed with respect to a remote system conducting a transaction with a single portable processor device, it shall be appreciated that it is anticipated that the present invention will operate to concurrently conduct transactions with a plurality of such devices. Accordingly, the remote system may receive a plurality of data packets although, for example, holding a transaction open for a particular processor device. Therefore, the remote system will identify a particular transaction or processor device to which a data packet is associated and operate to conduct that transaction independent of and substantially unaffected by other concurrent transactions.

It shall be appreciated from the foregoing that the present invention operates to provide fault tolerant and secure transactions, such as financial transactions, over an unsecured and even unstable communication link. Furthermore, as state information with respect to transactions conducted with particular portable processor devices are stored, and substantially synchronized, at both the portable processor device and the remote system, the present invention operates to provide transaction roll back as might be embodied in a two phase commit protocol. However, it shall be appreciated that the present invention operates to provide such advantages without the use of a centralized arbiter of the transaction. Instead, the present invention relies on the distributed arbitration of the secure portable processor and the trusted remote system.

Additionally, as no single arbiter, such as a server, is utilized to provide the desired complete transaction or a roll back to a previous state, and instead the trusted devices at each end of the transaction perform this functionality, communications may be optimized. Because of the trusted and intelligent nature of the devices disposed at each end of the transaction, the information communicated therebetween may be limited to that necessary to conduct the transaction itself.

Although the present invention and its advantages have been described in detail, it should be understood that various changes, substitutions and alterations can be made herein without departing from the spirit and scope of the invention as defined by the appended claims.

What is claimed is:

1. A method for predictably completing an electronic transaction conducted at least in part on a first system and a second system, said method comprising the steps of:

interfacing said first system with said second system, said interface providing data communication between said first system and said second system suitable for conducting said transaction;

initiating a current transaction through information communication between said first and second systems;

determining exclusively under control of said first system whether a previous transaction in so far as accomplished on said first system has successfully completed;

restoring a previous state of said first system if said previous transaction has not successfully completed;

updating a register accessible only to said first system upon commencement of said current transaction in so far as accomplished on said first system to indicate said current transaction has commenced;

updating a memory accessible only to said first system to store a copy of any information which is to be altered by said current transaction; and updating said register upon completion of said current transaction in so far as accomplished on said first system to indicate said current transaction has concluded.

2. The method of claim 1, further comprising the step of:

attempting to accomplish said previous transaction if said previous transaction has not successfully completed, wherein said restoring step is performed after said attempting step if said attempting step is not able to accomplish said previous transaction.

3. The method of claim 1, wherein said first system is a portable postage vault and said second system is a general purpose processor based system.

4. The method of claim 3, wherein said current transaction is a postage value credit deduction transaction transferring postage credit from said portable postage vault to said second system for printing of a meter stamp by said second system.

5. The method of claim 3, wherein said current transaction is a postage value credit incrementing transaction transferring postage credit from said second system to said portable postage vault.

6. The method of claim 1, wherein said second system comprises:

a host system disposed locally to said first system and coupled to said first system through an unsecured data path.

7. The method of claim 6, wherein said unsecured data path includes a one wire bus.

8. The method of claim 6, wherein said second system further comprises:

a remote system coupled to said host system through an unsecured data path.

9. The method of claim 8, wherein said second mentioned data path is selected from the group consisting of the Internet, a wide area network, a local area network, and a public switched network.

10. The method of claim 8, further comprising the steps of:

determining exclusively under control of said remote system whether a previous transaction in so far as accomplished on said remote system has successfully completed;

interrupting said transaction if said previous transaction in so far as accomplished on said remote system has not successfully completed;

updating a register accessible only to said remote system upon commencement of said transaction in so far as accomplished on said remote system to indicate said transaction has commenced;

updating a memory accessible only to said remote system to store a copy of any information which is to be altered by said transaction;

updating said register upon completion of said transaction in so far as accomplished on said remote system to indicate said transaction has concluded.

11. The method of claim 1, further comprising the steps of:

executing at least one of a plurality of predefined sets of procedures on said first system, wherein said predefined sets of procedures are each defined to interact producing only two states upon execution, the first said state being successful completion of the set of procedures and the second said state being reversal of incomplete execution of the set of procedures.

12. The method of claim 11, wherein execution of said predefined set of procedures comprises the steps of:

determining whether previous execution of a predefined set of procedures of said plurality has concluded;

restoring a previous state of said first system if said previous execution has not concluded;

changing a register upon commencement of said execution of said predefined set of procedures to reflect commencement;

copying information which is to be altered by execution of said predefined set of procedures to a protected memory area; and changing said register upon completion of said execution of said predefined set of procedures to reflect completion.

13. The method of claim 11, wherein execution of said predefined set of procedures further comprises the step of:

changing said register upon reaching a preselected intermediate point in said execution of said predefined set of procedures.

14. The method of claim 11, wherein procedures of said plurality of predefined sets of procedures are atomic transactions internal to said first system and other procedures of said predefined sets of procedures are atomic transactions external to said first system.

15. The method of claim 14, wherein said current transaction includes executing at least one of said internal atomic transactions and at least one of said external atomic transactions.

16. The method of claim 11, wherein execution of said predefined set of procedures comprises the steps of:

generating a request corresponding to said transaction;

transmitting said request to a process operable to accomplish at least a portion of said transaction;

accepting a transaction command in response to transmission of said request;

generating a commit corresponding to acceptance of said transaction command; and transmitting said commit to said process operable to accomplish at least a portion of said transaction.

17. The method of claim 16, wherein said process operable to accomplish at least a portion of said transaction is operable exclusively in said first system.

18. The method of claim 16, wherein said process operable to accomplish at least a portion of said transaction is operable exclusively external to said first system.

19. A system utilized in conducting electronic transactions adapted to conduct fault tolerant transactions, said system comprising:

a first processor based system coupled to a second processor based system via an unsecured data path;

wherein said first system includes:

an operating code providing a limited set of predefined commands, ones of said commands defining at least a portion of said transaction;

a CPU operating under control of said operating code;

a limited access non-volatile memory area, said memory area being accessible to devices external to said first system only under control of said CPU;

means for indicating a state of said first system, said indicating means being accessible only to said CPU;

means for storing information associated with a prior state of said first system, said storing means being accessible only to said CPU;

means for restoring said first system to said prior state through reference to said information associated with said prior state; and means for interfacing with said second processor based system, said interface means providing data communication between said first system and said second system, said second system being external to said first system, wherein at least a portion of said transaction includes data communication between said first system and said second system through said interfacing means; and wherein said second system includes:

a general purpose computer;

means for indicating a state of said first system; and means for storing information associated with a prior state of said first system.

20. The system of claim 19, wherein said states indicated by said indicating means include at least one state selected from the group consisting of a transaction has commenced, a transaction has completed, and a transaction was unsuccessful.

21. The system of claim 19, wherein said states indicated by said indicating means are updated to indicate a predefined milestone in said transaction being reached.

22. The system of claim 19, wherein said first system is selected from the group consisting of a touch memory unit, a PCMCIA card, a smart card, and a smart disk.

23. The system of claim 19, wherein said unsecured data path includes a one wire bus.

24. The system of claim 19, wherein said second system further comprises:

a remote system coupled to said general purpose computer via an unsecured data path.

25. The system of claim 24, wherein said last mentioned data path is selected from the group consisting of the Internet, a wide area network, a local area network, and a public switched network.

26. The system of claim 24, wherein said transaction is a financial transaction and said remote system comprises means for dispensing monetary value to said first system, and wherein said first system comprises means for storing said monetary value in said memory area.

27. The system of claim 19, wherein at least one command of said limited set of predefined commands comprises:

an atomic transaction defining processing of said one command by said CPU to produce only two states, the first said state being successful completion of the command and the second said state being reversal of incomplete processing of the command.

28. The system of claim 27, wherein said atomic transaction comprises:

means operable upon completion of processing of said command for controlling said indicating means to indicate completion of processing said command in said indicating means.

29. The system of claim 27, wherein said atomic transaction further comprises:

means for generating a request corresponding to said transaction;

means for transmitting said request to a process operable to accomplish at least a portion of said transaction;

means for accepting a transaction command in response to transmission of said request;

means for generating a commit corresponding to acceptance of said transaction command; and means for transmitting said commit to said process operable to accomplish at least a portion of said transaction.

30. The system of claim 29, wherein said process operable to accomplish at least a portion of said transaction is internal to said first processor based system.

31. The system of claim 29, wherein said process operable to accomplish at least a portion of said transaction is external to said first processor based system.

32. The system of claim 27, wherein said atomic transaction comprises:
means for controlling said storing means to store information associated with the state of said first processor at commencement of processing said command; and
means for controlling said indicating means to indicate commencement of processing said command in said indicating means.

33. The system of claim 32, wherein said atomic transaction further comprises:
a process to store an indication of accomplishing a predefined processing milestone of said command in said indicating means.

34. The system of claim 32, wherein said atomic transaction further comprises:
means for restoring said first processor to a previous state.

35. The system of claim 34, wherein said restoring means comprises:
means for determining if a previous command has completed processing through reference to said indicating means; and
means for copying information stored by said storing means to portions of said memory area previously associated with said copied information.

36. A method to provide only predefined conclusions to a transaction, said predefined conclusions providing for only two conclusion states, the first said state being successful completion of said transaction and the second said state being to roll back an incomplete transaction, said method comprising the steps of:
initializing a first processor based system to substantially permanently operate as a secure portable processor device, said initialization comprising the steps of:
defining only a limited number of predefined commands operable in said first system, at least one of said commands defining at least a portion of said transaction as fulfilled on said first system;
limiting access to non-volatile memory areas to restrict devices external to said first system from direct access to said memory areas;
identifying a register within said memory areas for use in indicating a state of said first system; and
identifying a previous state storage area within said memory areas for use in storing information associated with a prior state of said first system;
interfacing said first system with a second processor based system, said interface providing data communication between said first system and said second system;
initiating a current transaction through information communication between said first and second systems;
determining whether a previous transaction as fulfilled on said first system has concluded;
restoring a previous state of said first system utilizing information stored in said previous state storage area if said previous transaction has not concluded;
updating said register upon commencement of said current transaction to indicate said transaction has commenced;
updating said previous state storage area to store information stored in areas of said memory areas which are to be altered by said current transaction; and
updating said register upon completion of said current transaction to indicate said current transaction has concluded.

37. The method of claim 36, further comprising the step of:
updating said register upon reaching a predefined event in said transaction.

38. The method of claim 36, wherein at least one command of said limited set of predefined commands defines processing by said CPU to produce only two states upon execution of said command, the first said state being successful completion of the command and the second said state being reversal of incomplete processing of the command.

39. The method of claim 36, wherein execution of at least one command of said limited set of predefined commands comprises the steps of:
generating a first data packet indicating at least a portion of said transaction to be performed by a process;
communicating said first data packet to said process; and
accepting a second data packet from said process responsive to said first data packet when said at least a portion of said transaction is performed by said process.

40. The method of claim 39, wherein said at least one command of said limited set of predefined commands further comprises the steps of:
generating a third data packet indicating acceptance of said second data packet; and
communicating said third data packet to said process, wherein said process relies on said third data packet to determine said at least a portion of said transaction has been successfully performed.

41. The method of claim 36, wherein execution of at least one command of said limited set of predefined commands utilized to fulfill said transaction comprises the steps of:
determining whether a previous command has concluded;
restoring a previous state of said first system utilizing information stored in said previous state storage area if said previous command has not concluded;
updating said register upon commencement of said command to indicate said command has commenced;
updating said previous state storage area to store information stored in areas of said memory areas which are to be altered by said command;
updating said register upon completion of said command to indicate said command has concluded.

42. The method of claim 41, wherein execution of said at least one command further comprises the steps of:
updating said register upon reaching a predefined event in said command.

43. The method of claim 36, wherein said second system comprises:
a general purpose computer coupled to said first processor via an unsecured data path.

44. The method of claim 43, wherein said second system further comprises:
a remote system coupled to said general purpose computer via an unsecured data path.

* * * * *